Figure 1:
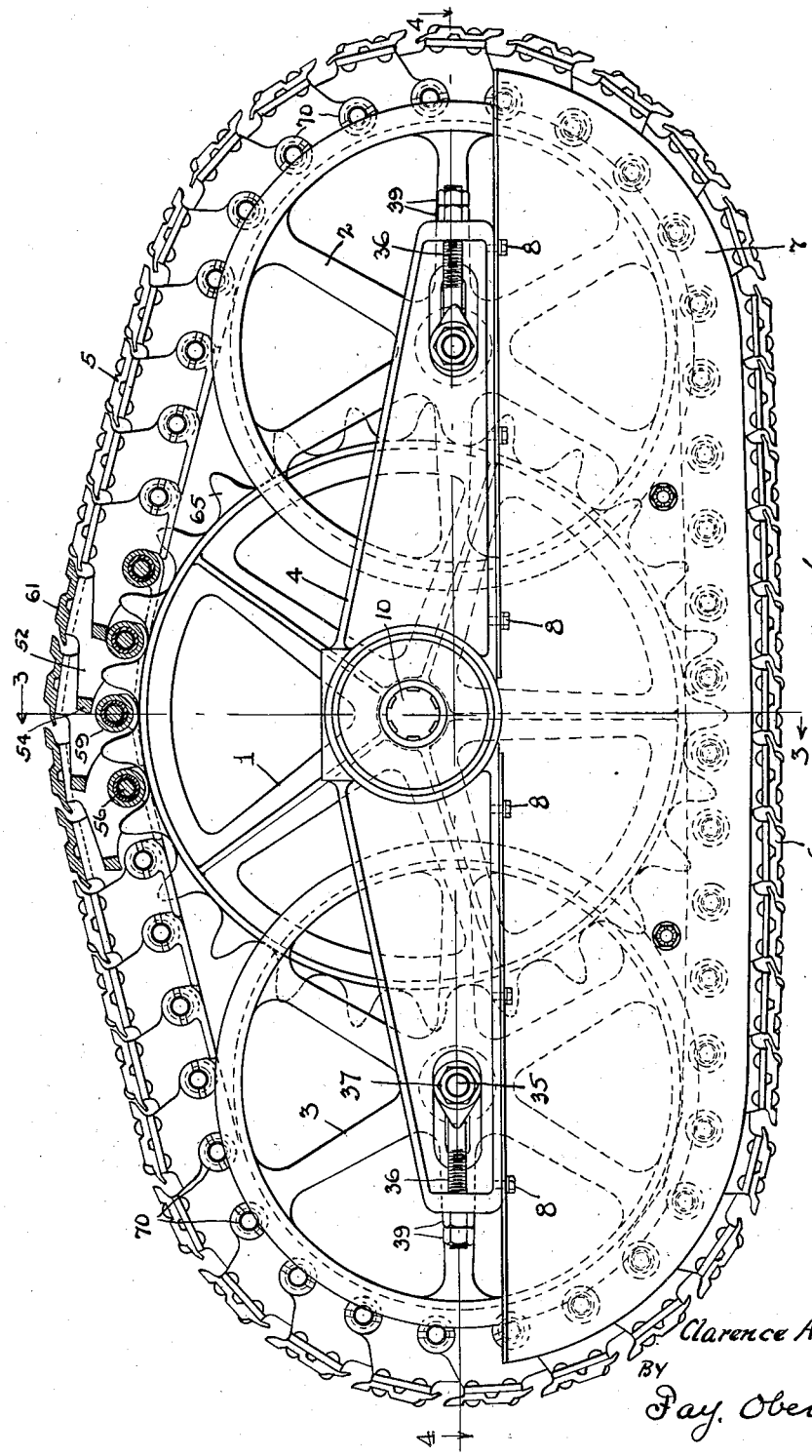

Feb. 19, 1935.  C. A. HENNEUSE  1,991,502
CRAWLER TRACTOR
Filed March 18, 1930  3 Sheets-Sheet 1

INVENTOR.
Clarence A. Henneuse
BY
Fay, Oberlin & Fay
ATTORNEYS.

Feb. 19, 1935.   C. A. HENNEUSE   1,991,502
CRAWLER TRACTOR
Filed March 18, 1930   3 Sheets-Sheet 2
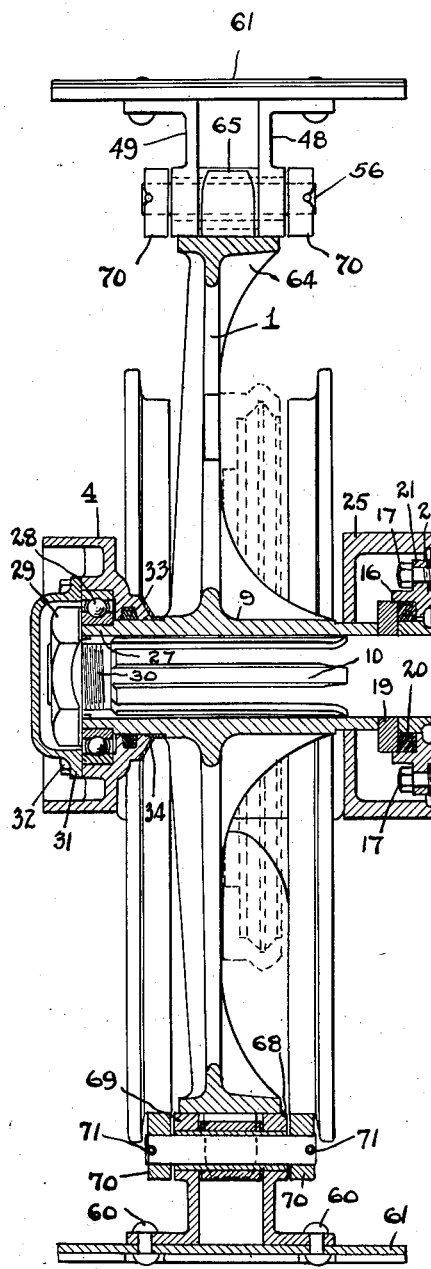
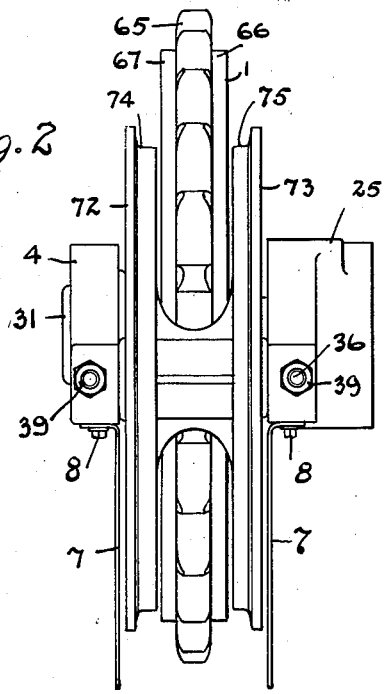
Fig. 2
Fig. 3
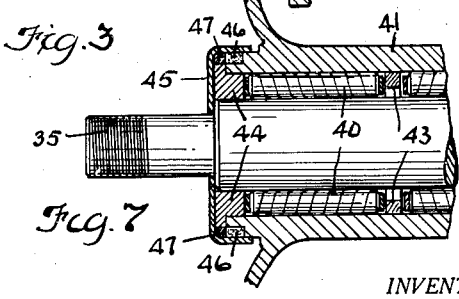
Fig. 7
INVENTOR.
Clarence A. Henneuse
BY
Fay, Oberlin & Fay
ATTORNEYS.

Feb. 19, 1935. C. A. HENNEUSE 1,991,502
CRAWLER TRACTOR
Filed March 18, 1930 3 Sheets-Sheet 3
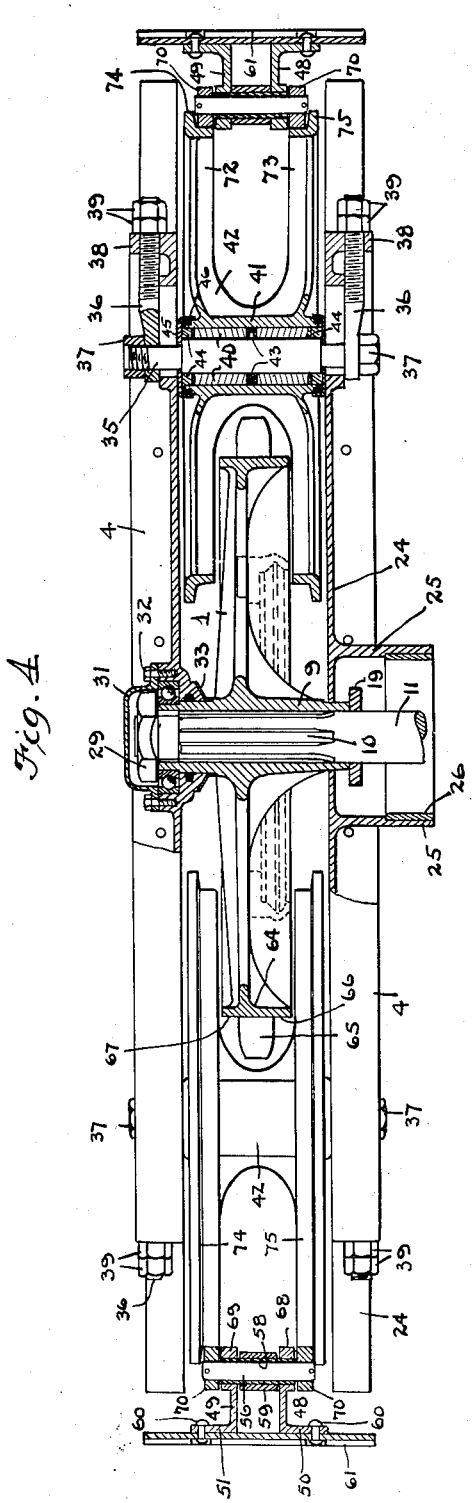
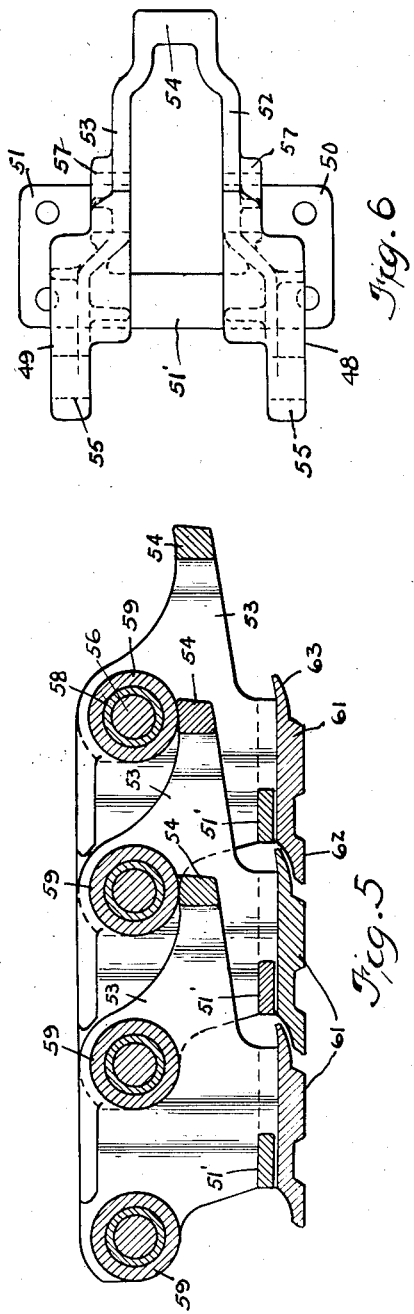
INVENTOR.
Clarence A. Henneuse
BY
Fay, Oberlin & Fay
ATTORNEYS.

Patented Feb. 19, 1935

1,991,502

UNITED STATES PATENT OFFICE 1,991,502

CRAWLER TRACTOR

Clarence A. Henneuse, Bucyrus, Ohio

Application March 18, 1930, Serial No. 436,712

2 Claims. (Cl. 305—3)

This invention, relating as indicated to crawler tread for tractors, has specific reference to improvements in the construction of the endless track common to such tractors and also to improvements in the means whereby such tread is supported and driven.

In order to insure efficient operation of a crawler tread it is essential that the entire unit on which such tread is mounted be pivoted on the axle of the tractor so that the tread unit may independently adapt itself to the inequalities of the ground over which the tractor passes. A further feature of construction which is highly desirable in mechanisms of this character is that the drive be located at the center of the crawler unit for the reasons hereinafter more fully explained.

In order to insure a minimum amount of wear on the various parts of the crawler mechanism, especially the pins which support and interconnect various links in the crawler tread chain, it is essential that no portion of the chain be under tension regardless of the amount of power transmitted by the driving sprocket. If maladjustment of the flexible track with respect to the driving pinion is permitted to occur, that is, if a portion of the chain as it encircles the crawler mechanism is placed under tension, not all of the driving force of the sprocket will be on that portion of the track which is in contact with the ground. By maintaining driving contact between the driving sprocket and only that portion of the chain which is in contact with the ground the balance of the crawler mechanism will be free from internal stresses which would curtail the efficiency of the track-laying unit. The crawler tread unit must therefore be provided with means whereby proper adjustment of the track with respect to the driving sprocket may be attained so that the truck chain may travel with a maximum of freedom, resulting in an appreciable increase in the life of the various wearing parts.

In connection with the unusually heavy strains to which the tread bearing chain is placed as the tractor is propelled over the ground, considerable difficulty has heretofore been experienced in the construction of the links comprising this chain so that such links would properly transmit the load from the sprocket to the ground without causing a premature wear on the pins connecting the adjacent links. In order to insure maximum life to the pins connecting the links of the tread chain it is essential that the main load of the tractor be carried through the links and transmitted to the ground without placing the connecting pins under any direct stress.

When the tractor is called upon to traverse relatively soft ground the tread bearing chain should be so constructed that a concave deflection thereof in that portion which is next to the ground be prevented so as to prevent a substantially rigid section of the chain to the soft earth. A chain so constructed must have the links capable of convex movement as the chain passes over the idler elements and the driving sprocket.

Tractors equipped with crawler treads are usually employed under conditions where a considerable amount of loose dirt is present, which dirt, unless prevented, will work its way into the moving parts of the mechanism and cut down the operable efficiency thereof as well as effect a premature wear.

It is among the objects of my invention to provide a crawler tread construction, adaptable to be used with tractors, which shall have all of the above mentioned desirable features. Other objects of my invention will appear as the description proceeds.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Fig. 1 is a side elevation, which is part sectional, of the mechanism comprising my invention; Fig. 2 is an end elevation of the mechanism showing the tread-bearing chain removed; Fig. 3 is a transverse sectional view of the mechanism illustrated in Fig. 1 taken on the plane substantially indicated by the lines 3—3; Fig. 4 is a longitudinal section of the mechanism illustrated in Fig. 1 taken on the plane substantially indicated by the line 4—4; Fig. 5 is a sectional view of a plurality of contiguous links forming the flexible tread; Fig. 6 is a plan view of one of the links of the tread showing the tread plate removed therefrom; and Fig. 7 is a fragmentary sectional view on an enlarged scale showing the mounting for the idler wheels.

Referring more specifically to the drawings and more especially to Fig. 1 and other figures where like numerals are employed to designate like parts, the mechanism comprising my invention consists of a driving sprocket 1 and idler wheels 2 and 3, which sprocket and idlers are supported by a frame 4. A track 5 surrounds the sprocket and idler wheels so as to present a longitudinal section 6 thereof to the ground over which the tractor passes in the manner common to this form of tread construction. The frame 4 has a shield 7 secured thereto by means of bolts 8, and depending therefrom, which shield is adapted to exclude dirt and like foreign substances from the operating mechanism comprising the tread unit.

The sprocket wheel 1 has the interior of its hub 9 formed with longitudinal serrations adapted to engage the splined end 10 of an axle 11. The axle 11, which may be the axle of any common type of tractor, not shown, has its inner end 12 splined to receive a pinion common to all differential mechanisms and is encompassed by an axle housing 13. The axle housing 13 has positioned therein oppositely disposed bearings 14 and 15 which are removably secured therein by means of an annular retaining member 16 which is secured to the axle housing by means of bolts 17. The axle 11 has a circumferential flange or ring 18 projecting therefrom which is engaged by the bearings 14 and 15 to secure such axle against axial movement with respect to its housing. Positioned intermediately of the hub 9 of the sprocket 1 and the securing member 16 is an annular ring 19 which secures the grease-retaining and dust-excluding packing ring 20. Positioned intermediately of the circumferential flange 21 of the member 16 and the terminal portion 22 of the axle housing 13 is a shim body 23 by means of which axial adjustment of the securing member 16 may be obtained when the bolts 17 are tightened down. This axial adjustment makes possible the proper location of the bearings 14 and 15 with respect to the flange 18.

As most clearly shown in Figs. 3 and 4, the inner tread frame 24 has integrally formed therewith, or rigidly secured thereto, a cup-like projection 25 which encompasses the terminal portion 22 of the housing 13. A flat band 26 is positioned between the inner periphery of the cup 25 and the outer periphery of the terminal portion 22 of the housing, which band serves as a grease retaining and dust excluding means for protecting the bearings mounted on the shaft from foreign materials which are ever present in this area during the operation of the tractor. The frame member 4 revolubly supports the terminal portion 27 of the hub 9 by means of friction reducing bearings 28 which are secured in place by means of a nut 29 threadably engaging the reduced end 30 of the axle 11. The bearing 28 is protected against dust and dirt by means of a closure cap 31 which is secured in place by bolts 32, also a packing ring 33 and a flanged annular member 34 which respectively encompasses the hub 9 of the sprocket wheel 1.

Adjustably secured in the terminal portion of the side frames 4 and 24 are pins 35 which are terminally engaged by eyebolts 36 secured thereto by nuts 37. The eyebolts 36 pass through the ends 38 of the side frames 4 and 24 and are axially adjustably secured by locknuts 39. The pins 35 have mounted thereon friction reducing bearings 40 which revolubly support hubs 41 of the idler wheel generally indicated at 42. The bearings 40 are separated by an annular member 43 and are axially restrained at their outer ends by annular rings 44. The rings 44 are secured in place by flanged cups 45 which encompass grease-retaining and dust-excluding rings 46. Positioned coaxially with the grease-retaining rings 46 are relatively small preferably metallic rings 47 which serve as a securing means for these grease rings.

The endless web or track 5 is made up of a plurality of links most clearly shown in Figs. 3 to 6, inclusive. The links forming the elements of the track 5 have vertically extending side bars 48 and 49 which have integrally formed therewith along their lower edges laterally extending flanges 50 and 51 which are interconnected by webs 51'. The side members 48 and 49 have one of their ends formed into longitudinally extending arms 52 and 53 which are terminally united by a crossbar 54. The side members 48 and 49 have apertures 55 formed therein which are adapted to secure the body of a pin 56, by means of which adjacent links are interconnected. Apertures 57 are formed in the members 52 and 53, which apertures are of a size adapted to receive bushings 58 coaxially mounted with the connecting pins 56. This construction permits free oscillation of one link with respect to its adjacent link as the track travels around the several wheels.

The member 54, which is the terminal portion of the projecting arms 52 and 53, is adapted to engage the rollers 59, which are coaxially mounted with the connecting pins 56, and this engagement, as most clearly shown in Fig. 5, prevents a concave deflection of the portion 6 of the track 5 which is in contact with the ground over which the tractor passes. Secured to the laterally projecting flanges 50 and 51 by means of rivets 60 are tread shoes 61 which have their terminal portions 62 and 63 so formed that the adjacent shoes are in overlying relationship so as to present a closed track to the ground.

The rim 64 of the sprocket wheel 1 has its outer periphery formed with a plurality of radially extending lugs 65 which are laterally bounded by cylindrical surfaces 66 and 67. The sprocket lugs 65, when the track is mounted on the sprocket wheel, lie intermediately of the side members 48 and 49 of the tread links and engage the rollers 59; and the cylindrical surfaces 66 and 67, respectively, engage the inner surfaces 68 and 69 of the members 48 and 49. The pins 56 are maintained in the above described assembled relation by means of the pins 71.

The idler wheels 2 and 3 are formed of laterally disposed spiders 72 and 73 which are spaced apart sufficiently to overlie the sprocket wheel 1. The outer peripheries of the webs 72 and 73 are formed with circumferentially groved faces 74 and 75 which engage the portions 70 of the next adjacent tread link which, it will be noted, correspond to side members 48 and 49.

The operable principles which distinguish my construction from those now commonly employed and which make this construction desirable from the standpoint of efficiency, as well as the longevity of the various operative parts will now be briefly described. The overlying relationship of the driving sprocket with respect to the idler wheels makes possible a relationship between the various parts which is desirable, due to the fact that a compact structure can be obtained having features adding to the efficiency of the track not found in any of the present forms of tread construction. By so arranging the idlers with respect to the sprocket, idlers of relatively large diameter may be employed while still maintaining a relatively short distance between the axes of rotation of the various wheels. This reduction in the distance between the axes of the idlers and the sprocket results in a compact construction which is desirable when crawlers of relatively short lengths are to be employed. The arrangement of the adjusting means, i. e., the bolts 36, is such that longitudinal adjustment of the idlers 2 and 3 with respect to the sprocket 1 can be obtained so that during the operation of the track no part thereof will be in tension. By properly adjusting the idlers 2 and 3 with respect to the sprocket 1 the movement of the chain around the several wheels can be so controlled that the driving force is transmitted from the sprocket to the chain only at that point at which the track is in contact with the ground. This feature is especially desirable in that the efficiency of the mechanism is increased, due to the fact that there are no internal stresses in the chain which detract from the driving power thereof, and also when the chain is permitted to freely rotate about the wheels the connecting pins which connect the various links are free from tension which usually results in premature wear of these parts.

The construction of the periphery of the sprocket wheel and the tread links presents features having desirable qualities not found in any of the present forms of construction. The shoulders 66 and 67 which bear directly upon the standards 48 and 49 of the tread shoes transmit the entire weight of the tractor to the ground without placing the pins which connect the shoes under tension. The sole function required of the pins therefore is to maintain connection between the respective links comprising the chain and to receive the driving torque from the sprocket wheel. The driving torque from the sprocket wheel is transmitted to the pins connecting the links through the lugs 65 which contact with rollers mounted on bushings on the connecting pins. The rollers 59, being so mounted, are free to rotate with the least amount of frictional resistance, thereby reducing the wear on the several parts and also decreasing the power lost in the track itself.

The construction of the links comprising the track as outlined in connection with the description of Fig. 5 is such that a concave deflection thereof is prevented when the track is in contact with the ground. This construction permits the tractor to travel over surfaces which are relatively soft and which offer insecured support to the tractor tread. The members 54 which prevent such concave deflection contact with the rollers 59 on the connecting pins, which rollers, being mounted on bushings and free to rotate, carry the load incidental to this restriction of concave deflection in such a manner that the wear of the several parts is reduced to a minimum.

The construction of the mountings for the idler wheels is particularly advantageous in that all dirt and other harmful elements are positively excluded from the bearings on which the idlers are mounted and the annular rings adjacent the ends of the bearings serve as end thrust members to prevent lateral movement of the idlers as the tractor passes over uneven ground.

In order that a tractor having crawler tread frames may efficiently operate over surfaces which are relatively uneven it is essential that the crawler units, as such, may freely rotate about a single axis. This freedom of rotation of the entire unit is accomplished by the mounting which is most clearly shown in Fig. 3. With this construction it is possible for the entire unit to oscillate with respect to the body of the tractor as the tractor passes over uneven ground and at the same time ample means is provided to carry the end thrust as well as the radial load on the axle.

Further description of my invention is deemed unnecessary for those acquainted with the art. Suffice it to say that for the purposes of this description only so much has been described as is believed to be essential to the operation of the mechanism.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a mechanism of the character described, the combination of a frame adapted to be oscillatably mounted on an axle housing, a toothed driven sprocket wheel mounted on the axle projecting from said housing and provided with cylindrical surfaces adapted to engage rail faces formed by elements carried on links composing a track; two idler wheels, one mounted at each end of said frame in overlapping relation with said sprocket wheel and each provided with cylindrical surfaces, said idler wheels being so mounted that the cylindrical surfaces thereof and the cylindrical surface on the sprocket wheel are substantially tangent to the same plane and a continuous track composed of links, joined together by pins, which are adapted to be engaged by the teeth on said sprocket wheel, and each carrying rail faces adapted in combination in said track to form runways for the cylindrical surface of the sprocket wheel and the cylindrical surfaces of the idler wheels.

2. A crawler-track link having male and female portions, comprising two laterally spaced longitudinally extending members, in the main parallel throughout but so oppositely offset intermediate their ends, that the distance between them at one end is greater than the distance between their outside faces at the other end, and having on each side of said offset in each member apertures, transversely aligned, whereby the link may be pinned to adjacent links; parts on the lower portions of said members adapted to support a grouser; a cross-tie between the terminals of the more closely spaced ends of the said members; and rail surfaces on the upper edges of said members, portions of said surfaces being over the female portions of the link and adapted to support the periphery of a wheel, and other portions of said surfaces being over the male portion of the link and adapted to support the periphery of a wheel overlapping said first mentioned wheel.

CLARENCE A. HENNEUSE.